W. P. LELAND.
Hay-Loading Device.
No. 220,025. Patented Sept. 30, 1879.
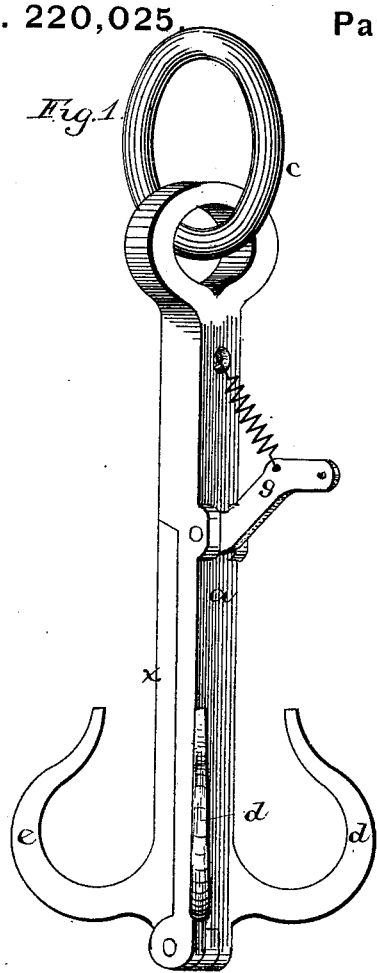
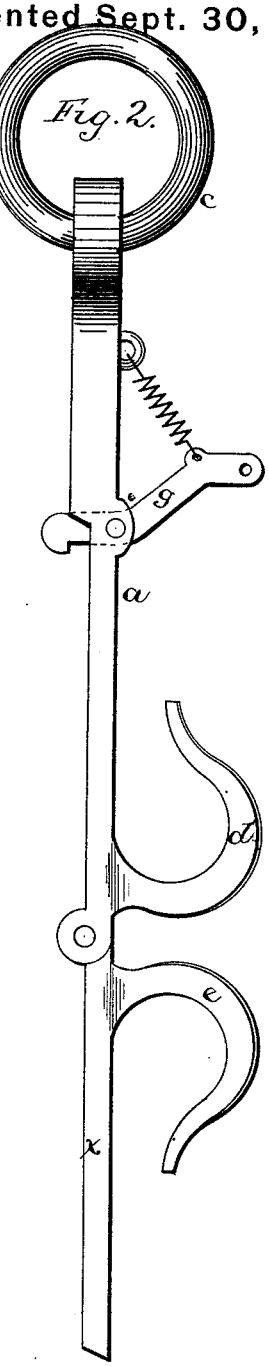
Witnesses:
J. W. Garner
W. S. D. Hames
Inventor:
Wm. P. Leland,
per
F. A. Lehmann,
Att'y

UNITED STATES PATENT OFFICE.

WILLIAM P. LELAND, OF MENDON, MICHIGAN.

IMPROVEMENT IN HAY-LOADING DEVICES.

Specification forming part of Letters Patent No. 220,025, dated September 30, 1879; application filed August 19, 1879.

*To all whom it may concern:*

Be it known that I, WILLIAM P. LELAND, of Mendon, in the county of St. Joseph and State of Michigan, have invented certain new and useful Improvements in Hay-Loading Devices; and I do hereby declare the following to be a full, clear, and exact description of the invention, such as will enable others skilled in the art to which it pertains to make and use it, reference being had to the accompanying drawings, which form part of this specification.

My invention relates to an improvement in hay-loading devices; and it consists in a shank having a ring at its upper end for the hoisting-rope to fasten in and one or more hooks on its lower end for the ropes of the sling to catch on, in combination with a rod that is hinged to the shank at its lower end, and provided with hooks for the other ends of the rope-sling to catch on, and which rod is held in place by a suitable spring-catch until released, when it falls and drops the load, as will be more fully described hereinafter.

Figure 1 is a perspective of my device when closed, and Fig. 2 is a side elevation of the same when open.

$a$ represents a shank, of suitable length and thickness, having a ring, $c$, in its upper end to fasten the hoisting-rope to, and one, two, or more hooks, $d$, on its lower end for the ends of the sling to catch on. A portion, $x$, of one side of this shank is cut away, as shown, and pivoted to the lower end of the shank is a rod which just fits the recess when the rod is raised up, so as to bear against the shank, as shown in Fig. 1. To the lower end of this rod are secured one, two, or more hooks, $e$, which correspond to the ones, $d$, on the shank, and serve for the other ends of the sling to catch on.

Passing through the shank $a$ is a pivoted spring-catch, $g$, which catches over the upper end of the rod, and holds it pressed against the shank until the catch is tripped by its cord, when the rod drops downward and releases anything hung upon the hooks.

By means of this construction any number of drop-hooks, or a hook for each rope, may be provided, and but a single hinge used. The drop-hooks are kept in an upright position without any looping device, or in any manner obstructing the point of the hooks over which the ropes are placed, which is a very important matter, as the ropes are usually hooked on while under tension.

It is very essential that a hook for each rope should be provided, for if more than one are hooked on the same hook they are liable to tangle or wedge fast.

By the use of my device a whole wagon-load of hay may be unloaded at one or two loads.

Having thus described my invention, I claim—

In a hay-loading device, a shank, $a$, having a hook or hooks secured thereto, in combination with the rod $x$, pivoted or hinged to the lower end of the shank, and provided with one or more hooks, and a catch to hold the rod in a vertical position against the shank, substantially as shown and described.

In testimony that I claim the foregoing I have hereunto set my hand this 15th day of August, 1879.

WILLIAM P. LELAND.

Witnesses:
 LEONIDAS G. WOOLLEY,
 O. M. BEALL.